United States Patent
Yamamoto et al.

(10) Patent No.: US 6,576,200 B1
(45) Date of Patent: Jun. 10, 2003

(54) CATALYTIC CONVERTER FOR AUTOMOTIVE POLLUTION CONTROL, AND OXYGEN-STORING COMPLEX OXIDE USED THEREFOR

(75) Inventors: Mari Yamamoto, Shiga (JP); Hirohisa Tanaka, Shiga (JP)

(73) Assignee: Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 09/383,146

(22) Filed: Aug. 26, 1999

(30) Foreign Application Priority Data

| Aug. 28, 1998 | (JP) | 10-243679 |
|---|---|---|
| Aug. 28, 1998 | (JP) | 10-243680 |
| Dec. 4, 1998 | (JP) | 10-344963 |

(51) Int. Cl.$^7$ ............ B01J 23/00; B01D 53/34
(52) U.S. Cl. ........ 422/177; 422/171; 422/180; 502/304; 502/326; 502/332
(58) Field of Search .............. 422/171, 177, 422/180; 502/303, 304, 326, 302, 332, 333, 334, 339

(56) References Cited

U.S. PATENT DOCUMENTS 5,837,642 A  * 11/1998 Tanaka et al. ............ 502/304
6,090,744 A  *  7/2000 Koda et al. ............... 502/304

FOREIGN PATENT DOCUMENTS

| DE | 197 13 103 A | 10/1997 |
|---|---|---|
| FR | 2 757 425 A | 6/1998 |
| JP | A-62-282641 | 12/1987 |
| JP | A-63-77544 | 4/1988 |
| JP | A-63-156545 | 6/1988 |
| JP | A-2-43951 | 2/1990 |
| JP | A-3-154635 | 7/1991 |
| JP | A-4-284847 | 10/1992 |
| JP | A-6-63403 | 8/1994 |
| WO | WO 93/15834 | 8/1993 |

OTHER PUBLICATIONS

Patent Abstracts of Japan vol. 011, No. 613 (C–424), May 26, 1987 & JP61 293550 A (Nissan Motor Co. Ltd.) Dec. 24, 1986.

* cited by examiner

Primary Examiner—Hien Tran
(74) Attorney, Agent, or Firm—Michael D. Bednarek; Shaw Pittman LLP (57) ABSTRACT

A catalytic converter for cleaning exhaust gas includes a heat-resistant support, and a coating formed on the support. The coating contains at least one kind of catalytically active substance and at least one kind of oxygen-storing oxide. The oxygen-storing oxide is selected from oxides of Pr and Tb. The oxygen-storing oxide may be $Pr_6O_{11}$ or $Tb_4O_7$. Alternatively, the oxygen-storing oxide may be a complex oxide which may be represented by the formula,

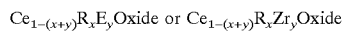

$Ce_{1-(x+y)}R_xE_y$Oxide or $Ce_{1-(x+y)}R_xZr_y$Oxide where "R" represents Pr or Tb, "E" represents an element selected from a group consisting of Nd, Y and Gd.

8 Claims, 7 Drawing Sheets

FIG.5
OSC IN REDUCING ATMOSPHERE

EX.1: $Pr_6O_{11}$
EX.2: $Tb_4O_7$
COM.1: $CeO_2$
COM.2: $Ce_{0.8}Zr_{0.2}O_2$

FIG.6

EX.3 : $Ce_{0.75}Pr_{0.2}Gd_{0.05}$Oxide
EX.4 : $Ce_{0.35}Tb_{0.6}Gd_{0.05}$Oxide
EX.5 : $Ce_{0.6}Pr_{0.3}Nd_{0.1}$Oxide
EX.6 : $Ce_{0.6}Tb_{0.3}Nd_{0.1}$Oxide
EX.7 : $Ce_{0.5}Pr_{0.4}Y_{0.1}$Oxide
EX.8 : $Ce_{0.5}Tb_{0.4}Y_{0.1}$Oxide
COM.1': $CeO_2$
COM.3 : $Ce_{0.5}Zr_{0.5}O_2$

FIG.8

EX.9 : $Ce_{0.3}Pr_{0.5}Zr_{0.2}$Oxide
EX.10 : $Ce_{0.3}Pr_{0.2}Zr_{0.5}$Oxide
EX.11 : $Ce_{0.6}Tb_{0.2}Zr_{0.2}$Oxide
EX.12 : $Ce_{0.2}Tb_{0.6}Zr_{0.2}$Oxide
COM.2': $Ce_{0.8}Zr_{0.2}O_2$
COM.3': $Ce_{0.5}Zr_{0.5}O_2$

FIG.9

FIG.10
OSC IN INERT ATMOSPHERE

EX.13 : $Ce_{0.8}Pr_{0.2}$Oxide
EX.14 : $Ce_{0.5}Pr_{0.5}$Oxide
EX.15 : $Ce_{0.8}Tb_{0.2}$Oxide
EX.16 : $Ce_{0.5}Tb_{0.5}$Oxide
COM.4: $Ce_{0.6}Zr_{0.4}O_2$
COM.5 : $Ce_{0.6}Yb_{0.1}Zr_{0.3}$Oxide

FIG.11
OSC IN REDUCING ATMOSPHERE

CATALYTIC CONVERTER FOR AUTOMOTIVE POLLUTION CONTROL, AND OXYGEN-STORING COMPLEX OXIDE USED THEREFOR

BACKGROUND OF THE INVENTION

1. Field of the Invention

The present invention relates to a catalytic converter for effectively cleaning the exhaust gas of an automotive internal combustion engine by removal of nitrogen oxide ($NO_x$), carbon monoxide (CO) and hydrocarbons (HC). The present invention also relates to an oxygen-storing complex oxide which may be advantageously used for such a catalytic converter.

2. Description of the Related Art

As is well known, the exhaust gas of an automotive internal combustion engine inevitably contains harmful substances such as $NO_x$, CO and HC. In recent years, particularly, the restrictions on exhaust gas cleaning are increasingly strict for environmental protection.

A so-called three-way catalytic converter has been most widely used for removing the above-described harmful substances. Typically, a three-way catalytic converter includes a honeycomb support made of a heat-resistant material such as cordierite, and a wash-coat formed on the surfaces of the respective cells of the honeycomb support. The wash-coat contains a heat-resistant inorganic oxide such as $Al_2O_3$, a catalytically active substance such as Pt, Pd and/or Rh, and an oxygen-storing oxide such as $CeO_2$. The catalytically active substance reducs $NO_x$ to $N_2$ while oxidizing CO and HC to $CO_2$ and $H_2O$, respectively.

The oxygen-storing oxide, typically $CeO_2$, has an oxygen storing capacity (hereafter abbreviated as "OSC"); that is, the capacity to occlude gaseous oxygen and to release the occluded oxygen. More specifically, $CeO_2$ is added for adjusting the oxygen concentration of gaseous atmosphere, so that excess oxygen in the gaseous atmosphere is occluded into the crystalline structure of $CeO_2$ in an oxygen-rich state (i.e., fuel-lean state which may be simply referred to as "lean state") for assisting the catalytic converter in reducing $NO_x$ to $N_2$ while releasing the occluded oxygen into the gaseous atmosphere in a CO- and/or HC-rich state (i.e., fuel-rich state which may be simply referred to as "rich state") for assisting the catalytic converter in oxidizing CO and HC to $CO_2$ and $H_2O$. Thus, the catalytic activity of the catalytically active substance is enhanced by the addition of $CeO_2$.

However, it has been found that grains or particles of $CeO_2$ grows due to sintering at high temperature. Such growth of $CeO_2$ results in a decrease of surface area, consequently causing gradual loss of OSC. Particularly, if the catalytic converter is mounted near the engine, it may be frequently subjected to an extremely high temperature of no less than 900° C. (or sometimes even higher than 1,000° C.), which prompts the grain growth of $CeO_2$.

Further, $CeO_2$ provides its intended OSC only under a condition where an oxidizing atmosphere (corresponding to a lean state) and a reducing atmosphere (corresponding to a rich state) are alternately repeated. More specifically, $CeO_2$ is capable of occluding oxygen only after it has previously undergone a reducing atmosphere for releasing the previously occluded portion of oxygen, whereas it is capable of releasing oxygen only after it has previously undergone an oxidizing state for occluding oxygen. Therefore, the air-fuel mixture supplied to the engine needs to be controlled in a narrow range (referred to as "window") near the stoichiometric state such that a lean state and a rich state are alternately repeated.

In view of the above problem, an oxygen sensor may be provided for monitoring the oxygen concentration of the exhaust gas, and the output of the oxygen sensor is used for controlling the air-fuel mixture in the narrow window. However, the oxygen sensor may be deteriorated during operation, so that it is possible that the control center point may unexpectedly shift from the stoichiometric state to a lean side. In such a case, $CeO_2$ in the catalytic converter may be always put in an oxidizing atmosphere and thus continue to occlude oxygen. As a result, $CeO_2$ becomes fully loaded with oxygen and is incapable of releasing it as long as the air-fuel mixture is held at the stoichiometric state or a lean state.

DISCLOSURE OF THE INVENTION

It is, therefore, an object of the present invention to provide a catalytic converter for cleaning exhaust gas which is capable of retaining a high catalytic activity for a long time even under severe operating conditions above 900° C.

Another object of the present invention is to provide an oxygen-storing oxide which, when incorporated in a catalytic converter, is capable of effectively storing and releasing oxygen even if the control center point for the air-fuel mixture shifts from the stoichiometric state to a lean side.

According to one aspect of the present invention, a catalytic converter for cleaning exhaust gas comprises a heat-resistant support, and a coating formed on the support, the coating including at least one kind of catalytically active substance and at least one kind of oxygen-storing oxide, wherein the oxygen-storing oxide is selected from oxides of Pr and Tb.

The inventors have found that the an oxide of Pr or Tb exhibits a much higher OSC than $CeO_2$ both before and after performing high-temperature aging. Therefore, a catalytic converter utilizing an oxide of Pr or Tb in place of or in combination with $CeO_2$ is capable of providing a high catalytic activity over a long period even under a severe high-temperature operating condition.

In a first embodiment of the present invention, the oxygen-storing oxide is $Pr_6O_{11}$. Such a simple oxide of Pr may be used in combination with $CeO_2$ or Ce—Zr complex oxide.

In a second embodiment of the present invention, the oxygen-storing oxide is $Tb_4O_7$. Again, such a simple oxide of Tb may be used in combination with $CeO_2$ or Ce—Zr complex oxide.

In a third embodiment, the oxygen-storing oxide is a complex oxide of the following formula, $$Ce_{1-(x+y)}R_xE_y\text{Oxide}$$

where "R" represents Pr or Tb, "E" represents at least one element selected from a group consisting of Nd, Y, Gd and Zr, $0.1 \leq x \leq 0.8$, $0 \leq y \leq 0.9$, and $0.1 \leq x+y \leq 0.9$. It should be appreciated that the notation "Oxide" is used because the proportion of oxygen in the complex oxide varies depending on the condition of the atmosphere and the valency of the co-existing elements other than Ce.

As previously described, $CeO_2$ provides an intended OSC only under a condition where an oxidizing atmosphere (corresponding to a lean state) and a reducing atmosphere are alternately repeated, consequently necessitating the air-fuel mixture to be controlled in a narrow window range across the stoichiometric state. On the other hand, the inventors have experimentally found that an oxide of Pr or Tb is capable of releasing oxygen not only in a reducing atmosphere but also in an inert atmosphere (corresponding to the stoichiometric state) after it has occluded oxygen in an oxidizing atmosphere.

According to the third embodiment, $CeO_2$ is complexed with an oxide of Pr or Tb. Therefore, the $CeO_2$ portion of the resulting complex oxide provides a good OSC under a condition where an oxidizing atmosphere and a reducing atmosphere are alternately repeated, whereas the Pr or Tb oxide portion of the complex oxide provides a good OSC under a condition where an oxidizing atmosphere and an inert atmosphere are alternately repeated. Thus, even if the control center point of an oxygen sensor shifts from the stoichiometric state to a lean side due to a deterioration, the oxygen-storing complex oxide can still provide a good OSC.

Further, any one of Nd, Y, Gd and Zr which may be added to the oxygen-storing complex oxide restrains grain growth of the complex oxide under high temperature. Thus, the catalytic converter incorporating the oxygen-storing complex oxide is capable of retaining a high catalytic activity for a long time even under a severe high-temperature operating condition. However, it is also possible to dispense with such a grain growth restraining element.

In the case where the "E" in the above formula is selected from a group consisting of Nd, Y and Gd, the complex oxide may preferably meet the relations $0.2 \leq x \leq 0.6$, $0.05 \leq y \leq 0.1$, and $0.25 \leq x+y \leq 0.7$. On the other hand, in the case wherein the "E" in the formula is Zr, the complex oxide should preferably meet the relations $0.2 \leq x \leq 0.6$, $0.2 \leq y \leq 0.6$, and $0.4 \leq x+y \leq 0.8$. Further, at least part of the complex oxide may preferably be solid solution.

Typicaly, the catalytically active substance may be a precious metal such as Ru, Rh, Pd, Ag, Os, Ir, Pt and Au. Preferably, however, the catalytically active substance may be selected from a group consisting of Pt, Rh and Pd. Each of these active substances may be used alone or in combination with another.

The coating may further contains at least one heat-resistant inorganic oxide selected from a group consisting of alumina, silica, titania, magnesia and ziroconia. Particularly useful is activated alumina.

The heat-resistant support, which may be made of cordierite, mullite, α-alumina or a metal (e.g. stainless steel), should preferably have a honeycomb structure.

The coating may have a single layer structure. Alternatively, the coating may comprise a plurality of laminated layers including an outermost layer, and the oxygen-storing oxide may be contained in at least one of the coating layers. In the latter, preferably, Pd and Rh as the catalytically active substances should be separately contained in different layers of the coating because the co-existence of these elements may adversely affect each other in catalytic activity. Further, Pd should preferably be contained in a layer of the coating other than the outermost layer because Pd is liable to suffer catalytic poisoning.

According to a second aspect of the present invention, there is provided an oxygen-storing complex oxide for a catalytic converter having the following formula, $$Ce_{1-(x+y)}R_xE_y\text{Oxide}$$

where "R" represents Pr or Tb, "E" represents at least one element selected from a group consisting of Nd, Y, Gd and Zr, $0.1 \leq x \leq 0.8$, $0 \leq y \leq 0.8$, and $0.1 \leq x+y \leq 0.9$.

The oxygen-storing complex oxide having the above formula may be prepared by using known techniques such as coprecipitation process or alkoxide process.

The coprecipitation process includes the steps of preparing a mixture solution which contains respective salts of Ce, Pr (or Tb) and Nd (or Y or Gd or Zr) in a predetermined stoichiometric ratio, then adding an aqueous alkaline solution or an organic acid to the salt solution for causing the respective salts to coprecipitate, and thereafter heat-treating the resulting coprecipitate for oxidization to provide a target complex oxide.

Examples of salts of Ce, Pr (or Tb) and Nd (or Y or Gd) include sulfates, nitrates, hydrochlorides, phosphates, acetates and oxalates. Examples of Zr salts include oxychloride, oxynitrate, oxysulfate and zirconium oxyacetate. Examples of aqueous alkaline solutions include an aqueous solution of sodium carbonate, aqueous ammonia and an aqueous solution of ammonium carbonate. Examples of organic acids include oxalic acid and citric acid.

The heat treatment in the coprecipitation process includes a heat-drying step for drying the coprecipitate at about 50~200° C. for about 1~48 hours after filtration, and a baking step for baking the coprecipitate at about 350~1,000° C. (preferably about 400~700° C.) for about 1~12 hours. During the baking step, the baking conditions (the baking temperature and the baking period) should be selected depending on the composition of the oxygen-storing complex oxide so that at least part of the complex oxide is in the form of solid solution.

The alkoxide process includes the steps of preparing an alkoxide mixture solution which contains Ce, Pr (or Tb) and Nd (or Y or Gd or Zr) in a predetermined stoichiometric ratio, then adding a deionized water to the alkoxide mixture solution or causing Ce, Pr (or Tb) and Nd (or Y or Gd or Zr) to hydrolyze, and thereafter heat-treating the resulting hydrolysate to provide a target complex oxide.

Examples of alkoxides usable for preparing the alkoxide mixture solution include respective methoxides, ethoxides, propoxides and butoxides of Ce, Pr (or Tb) and Nd (or Y or Gd or Zr). Instead, ethylene oxide addition salts of each of these elements are also usable.

The heat treatment in the alkoxide process may be performed in the same way as that in the coprecipitation process.

A precious metal such as Pt, Rh or Pd as a catalytically active substance may be supported on the oxygen-storing complex oxide by using known techniques. For instance, a solution containing a respective salt (e.g. 1–20 wt %) of Pt (and/or Rh and/or Pd) is first prepared, the complex oxide is then impregnated with the salt-containing solution, and thereafter the complex oxide is heat-treated. Examples of salts usable for this purpose include nitrate, dinitro diammine nitrate, and chloride. The heat-treatment, which is performed after impregnation and filtration, may include drying the complex oxide by heating at about 50~200° C. for about 1~48 hours and thereafter baking the complex oxide at about 350~1,000° C. for about 1~12 hours.

Alternatively, a precious metal may be supported on the oxygen-storing oxide at the time of performing the coprecipitation process or the alkoxide process by adding a salt solution of the precious metal to the mixture salt solution or the alkoxide mixture solution.

Other features and advantages of the present invention will be apparent from the following detailed description of the preferred embodiments given with reference to the accompanying drawings.

DETAILED DESCRIPTION OF THE PREFERRED EMBODIMENTS

The preferred embodiments of the present invention will be described below with reference to the accompanying drawings. However, it should be understood that the present invention is not limited to these embodiments.

Figure 1:
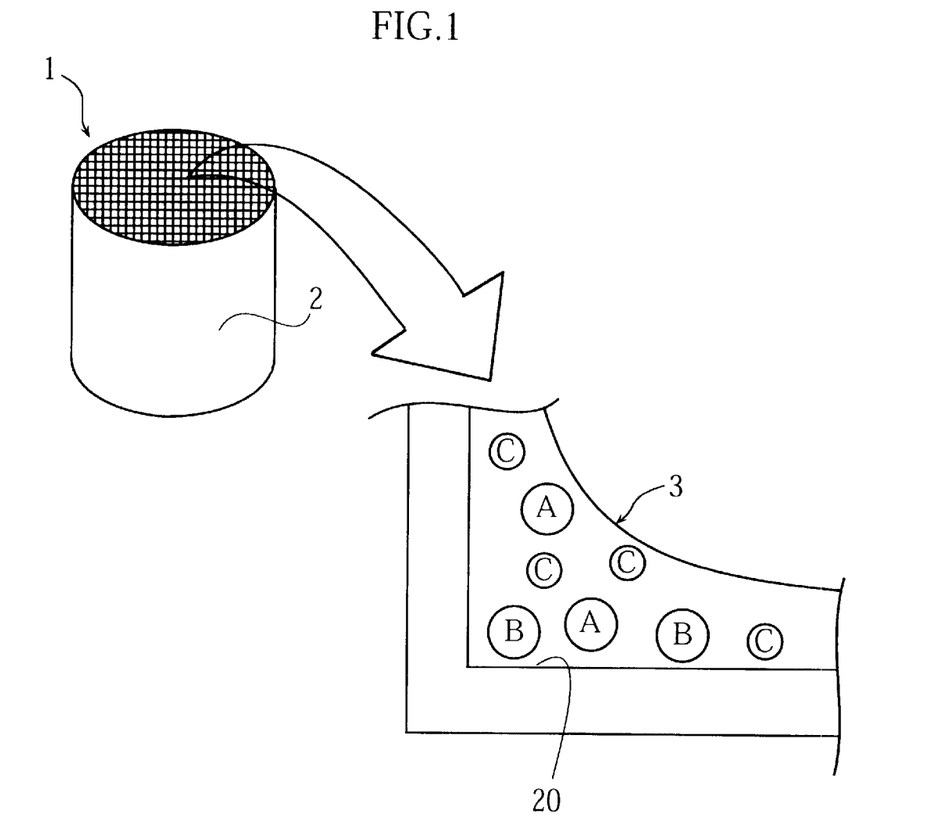
FIG. 1 shows a perspective view of a catalytic converter (honeycomb support) and a schematic view of a cell in the honeycomb support according to an embodiment of the present invention.

Referring first to FIG. 1, a catalytic converter, generally represented by reference numeral 1, includes a monolithic honeycomb support 2 which may be made of cordierite for example. Typically, the honeycomb support may have 400 cells/in$^2$ (62 cells/cm$^2$), a diameter of 105.7 mm and a length of 100 mm for example.

The inner surfaces 20 of each cell of the honeycomb support is formed with a coating 3. In this embodiment, the coating 3 has a single layer structure which contains a heat-resistant inorganic oxide A such as alumina, an oxygen-storing oxide B, and a catalytically active substance C such as Pd, Pt and/or Rh, wherein the oxygen-storing oxide is selected from oxides of Pr and Tb. The three components A, B, C may exist independently of each other. The coating 3 may further contains other elements which enhance the catalytic activity or heat-durability of the converter 1.

The oxygen-storing oxide C may be a simple oxide of Pr or Tb such as $Pr_6O_{11}$ or $Tb_4O_7$. Alternatively, the oxygen-storing oxide C may be a complex oxide of the following formula, where "R" represents Pr or Tb, "E" represents at least one element selected from a group consisting of Nd, Y, Gd and Zr, $0.1 \leq x \leq 0.8$, $0 \leq y \leq 0.8$, and $0.1 \leq x+y \leq 0.9$.

For fabricating the catalytic converter 1, powder of the heat-resistant inorganic oxide A and powder of the oxygen-storing oxide B are added to a salt solution of the catalytically active substance C to prepare a mixture slurry. The mixture slurry is then coated on the honeycomb support 2 by dipping the support 2 into the mixture slurry. The thus coated honeycomb support is then dried at 50~200° C. for 1~48 hours and thereafter baked at 350~1,000° C. for 1~12 hours. The target catalytic converter is thus obtained.

Figure 2:
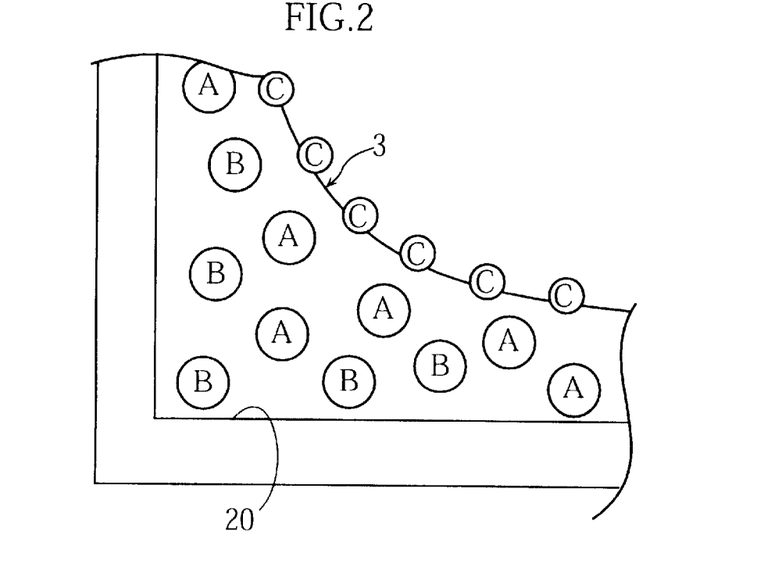
FIG. 2 is a schematic view of a cell in another catalytic converter embodying the present invention.

FIG. 2 shows another catalytic converter which includes a monolithic honeycomb support (only one cell shown) similar to that shown in FIG. 1. The inner surfaces 20 of each cell of the honeycomb support is formed with a coating 3. Again, the coating 3 in this embodiment has a single layer structure which contains a heat-resistant inorganic oxide A and a Pr- or Tb-containing oxygen-storing oxide B. However, a catalytically active substance C such as Pd, Pt and/or Rh is supported at the surface of the coating 3.

Such a catalytic converter may be fabricated in the following manner. First, powder of the heat-resistant inorganic oxide A and powder of the oxygen-storing oxide B are mixed in distilled water to prepare a mixture slurry. Then, the mixture slurry is then coated on the honeycomb support by dipping the support into the mixture slurry. The thus coated honeycomb support is then dried at 50~200° C. for 1~48 hours and thereafter baked at 350~1,000° C. for 1~12 hours. Then, a salt solution of the catalytically active substance C is prepared. Then, the previously coated honeycomb support is impregnated with the salt solution. Then, the impregnated honeycomb support is dried at 50~200° C. for 1~48 hours and thereafter baked at 350~1,000° C. for 1~12 hours. The target catalytic converter is thus obtained.

Figure 3:
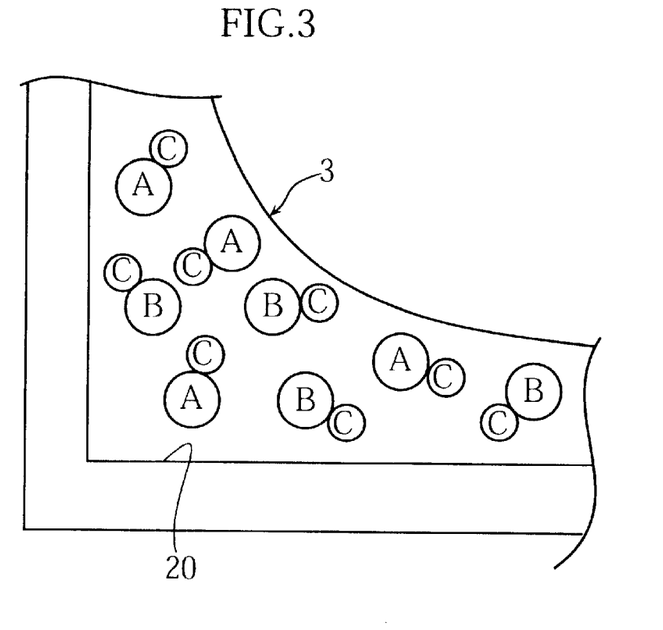
FIG. 3 is a schematic view of a cell in a further catalytic converter embodying the present invention.

FIG. 3 shows a further catalytic converter which includes a monolithic honeycomb support (only one cell shown) similar to that shown in FIG. 1. The inner surfaces 20 of each cell of the honeycomb support is formed with a coating 3. Again, the coating 3 in this embodiment has a single layer structure which contains a heat-resistant inorganic oxide A, a Pr- or Tb-containing oxygen-storing oxide B, and a catalytically active substance C. However, the catalytically active substance C is supported on the individual particles of the heat-resistant inorganic oxide A and the oxygen-storing oxide B.

Such a catalytic converter may be fabricated in the following manner. First, powder of the heat-resistant inorganic oxide A and powder of the oxygen-storing oxide B are mixed and suitably crushed in a ball mill to which a salt solution of the catalytically active substance C is added, thereby preparing a first mixture slurry. Then, the first mixture slurry is dried at 50~200° C. for 1~48 hours and thereafter baked at 350~1,000° C. for 1~12 hours, thereby causing particles of the catalytically active substance C to be supported on individual particles of the heat-resistant inorganic oxide A and the oxygen-storing oxide B. Then, the resulting particles are crushed suitably in a ball mill to which a distilled water is added for preparing a second mixture slurry. Then, the second mixture slurry is then coated on the honeycomb honeycomb support by dipping the support into the mixture slurry. The thus coated honeycomb support is then dried at 50~200° C. for 1~48 hours and thereafter baked at 350~1,000° C. for 1~12 hours. The target catalytic converter is thus obtained.

The catalytic converter shown in FIG. 3 may be modified so that the particles of the catalytically active substance C are supported either on the particles of the heat-resistant inorganic oxide A alone or on the particles of the oxygen-storing oxide B alone.

Figure 4:
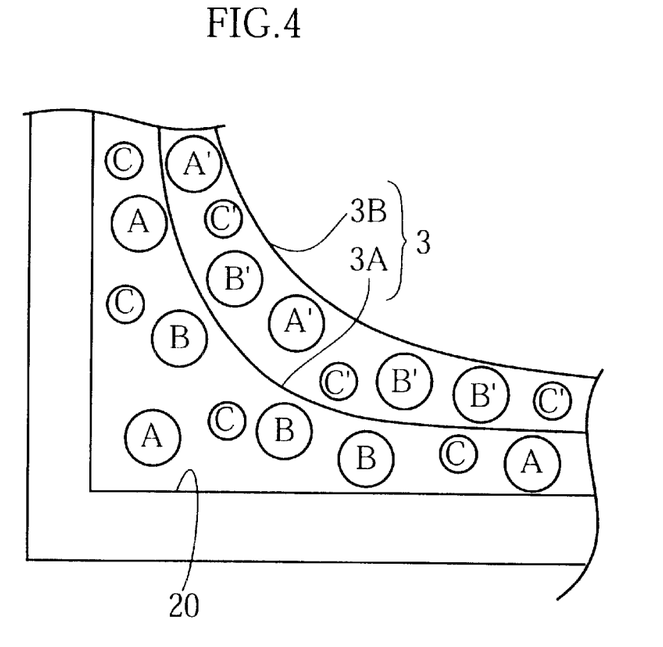
FIG. 4 is a schematic view of a cell in still another catalytic converter embodying the present invention.

FIG. 4 shows still another catalytic converter which includes a monolithic honeycomb support (only one cell shown) similar to that shown in FIG. 1. The inner surfaces 20 of each cell of the honeycomb support is formed with a coating 3. In this embodiment, the coating 3 has a double layer structure which includes a first or inner layer 3A and a second or outer (outermost) layer 3B. The inner layer 3A contains a heat-resistant inorganic oxide A, a Pr- or Tb-containing oxygen-storing oxide B, and a catalytically active substance C. Similarly, the outer layer 3B contains a heat-resistant inorganic oxide A', a Pr- or Tb-containing oxygen-storing oxide B', and a catalytically active substance C'.

Each of the inner coating layer 3A and the outer coating layer 3B may be formed in the same manner as the single layer coating 3 of the catalytic converter 1 illustrated in FIG. 1.

In case Pd is selected as a catalytically active substance, it should be preferably contained in the inner layer 3A because it is liable to suffer catalytic poisoning. Further, if Pd is used together with Rh, these two active substances should be preferably contained in the different layers 3A, 3B of the coating 3 because they are likely to alloy with each other, thereby resulting in lowering of their respective catalytic activity. Thus, Pd should be preferably contained in the inner layer 3A, whereas Rh should be preferably contained in the outer layer 3B. Moreover, Rh may be contained coexistently with Pt because these elements go well with each other.

Next, various examples of the present invention will be described together with comparative examples.

EXAMPLE 1

In Example 1, $Pr_6O_{11}$ which itself was commercially available was selected as an oxygen-storing oxide and determined for its oxygen storing capacity (OSC in a reducing atmosphere) before and after performing high-temperature redox aging. The determination of the OSC and the redox aging were performed in the following manner.

(High-Temperature Redox Aging)

The high-temperature redox aging was performed by cyclically placing the oxygen-storing oxide in three different atmospheres each held at a high temperature of 1,000° C. More specifically, a cycle of 30 minutes was repeated ten times for a total time of 5 hours, in which cycle the oxygen-storing oxide was placed in an inert atmosphere for 5 minutes, then in an oxidizing atmosphere for 10 minutes, again in the inert atmosphere for 5 minutes, and finally in a reducing atmosphere for 10 minutes. The respective composition of the oxidizing atmosphere, the inert atmosphere and the reducing atmosphere used here is listed in Table 1 below. During this test, each of the three different atmospheres was supplied at a flow rate of 300 $dm^3$/hr and maintained at a temperature of 1,000° C. by the inclusion of high-temperature $H_2O$ vapor.

TABLE 1

| Components | Oxidizing | Inert | Reducing |
|---|---|---|---|
| $H_2$ | — | — | 0.5 vol % |
| CO | — | — | 1.5 vol % |
| $O_2$ | 1.0 vol % | — | — |
| $CO_2$ | 8.0 vol % | 8.0 vol % | 8.0 vol % |
| $H_2O$ | 10 vol % | 10 vol % | 10 vol % |
| $N_2$ | 81 vol % | 82 vol % | 80 vol % |

(Determination of Pre-Aging OSC in Reducing Atmosphere)

The oxygen-storing oxide ($Pr_6O_{11}$ in Example 1) before performing the high-temperature redox aging was first placed in an $O_2$-rich oxidizing atmosphere for 40 minutes for causing occlusion of oxygen and then weighed. Then, the oxygen-storing oxide thus loaded with oxygen was placed in an inert atmosphere for 3 minutes. Thereafter, the oxygen-storing oxide was put in an $H_2$-rich reducing atmosphere for 7 minutes for causing release of oxygen and then weighed. The OSC of the oxygen-storing oxide was calculated per unit weight (1 g) by subtracting the weight of the $O_2$-released oxide from the weight of the $O_2$-occluded oxide. The respective composition of the oxidizing atmosphere, the inert atmosphere and the reducing atmosphere used here is listed in Table 2 below. During this test, each of the three different atmospheres was supplied at a flow rate of 3 $dm^3$/hr and maintained at a temperature of 500° C.

TABLE 2

| Components | Oxidizing | Inert | Reducing |
|---|---|---|---|
| $H_2$ | — | — | 20 vol % |
| $O_2$ | 50 vol % | — | — |
| $N_2$ | 50 vol % | 100 vol % | 80 vol % |

(Determination of Post-Aging OSC in Reducing Atmosphere) The oxygen-storing oxide ($Pr_6O_{11}$ in Example 1) after performing the high-temperature redox aging was similarly determined in the same manner as the pre-aging OSC.

(Results)

Figure 5:
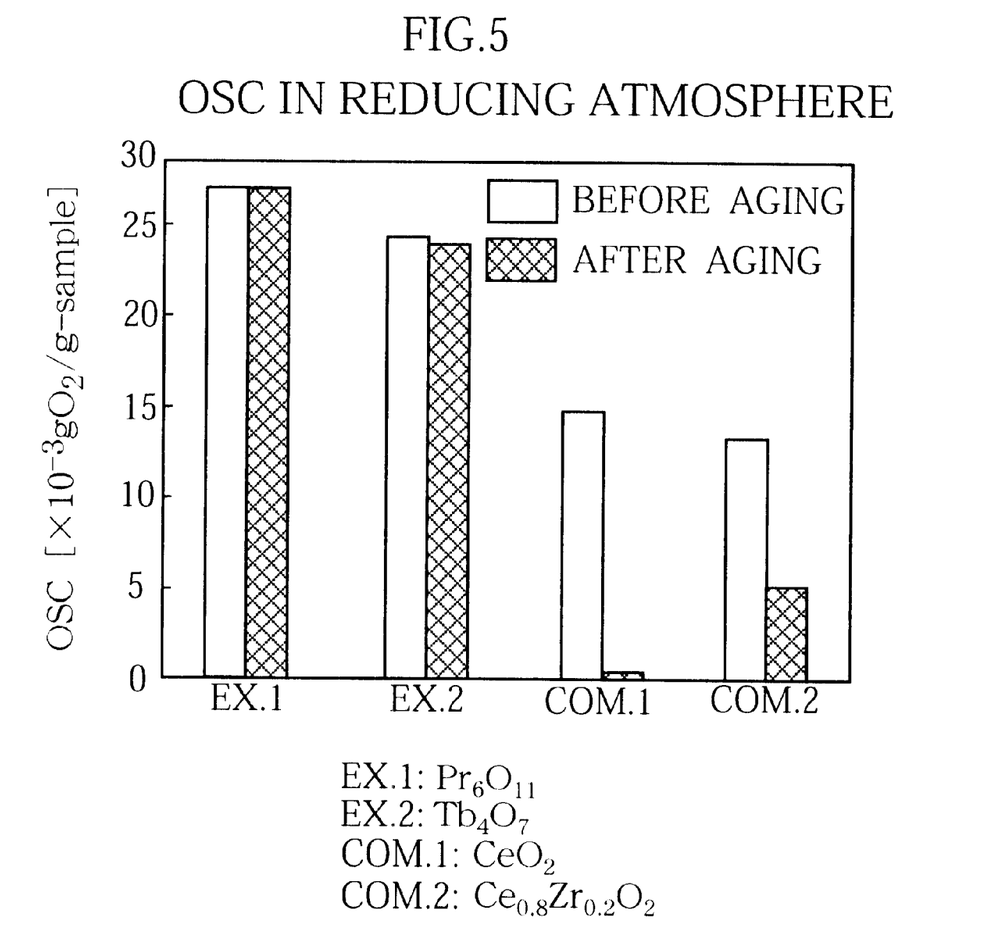
FIG. 5 is a graph showing the respective OSC of various oxygen-storing oxides in a reducing atmosphere.

The OSC of $Pr_6O_{11}$ which was determined before and after the high-temperature redox aging is shown in FIG. 5.

EXAMPLE 2

In Example 2, $Tb_4O_7$ which itself was commercially available was selected as an oxygen-storing oxide and determined for its pre-aging and post-aging OSC in the same manner as in Example 1. The results are also shown in FIG. 5.

Comparison 1

In Comparison 1 (comparative example), $CeO_2$ which itself was commercially available was selected as an oxygen-storing oxide and determined for its pre-aging and post-aging OSC in the same manner as in Example 1. The results are also shown in FIG. 5.

Comparison 2

In Comparison 2, $Ce_{0.8}Zr_{0.2}O_2$ as an oxygen-storing oxide was prepared and determined for its pre-aging and post-aging OSC in the same manner as in Example 1. The results of the tests are also shown in FIG. 5. The preparation of the Ce—Zr complex oxide was performed in the following manner.

(Preparation of $Ce_{0.8}Zr_{0.2}O_2$)

The Ce—Zr complex oxide used in this comparative example was prepared by the so-called alkoxide process. Specifically, an alkoxide mixture solution was first prepared by dissolving, in 200 $cm^3$ of toluene, 59.2 g (0.1368 mol) of cerium butoxide and 13.1 g (0.0342 mol) of zirconium butoxide. Then, the alkoxide mixture solution was gradually dripped into 600 $cm^3$ of deionized water in about 10 minutes for causing hydrolysis of the butoxide mixture. Then, the toluene and water content of the butoxide mixture solution was removed by vaporization. Then, the remaining hydrolysate (precursor) was dried at 60° C. for 24 hours and thereafter baked in an electric oven at 450° C. for 3 hours, thereby providing the target Ce—Zr complex oxide.

Evaluation of FIG. 5

As appreciated from FIG. 5, $Pr_6O_{11}$ (Example 1) and $Tb_4O_7$ (Example 2) are far superior in OSC than $CeO_2$ (Comparison 1) and $Ce_{0.8}Zr_{0.2}O_2$ (Comparison 2) both before and after the high-temperature redox aging. Therefore, it is expected that a catalytic converter utilizing the Pr- or Tb-containing oxygen-storing oxide combined with a catalytically active substance or substances will provide a high catalytic activity not only before aging but also after long use under severe high temperature conditions.

EXAMPLE 3

In Example 3, $Ce_{0.75}Pr_{0.2}Gd_{0.05}$Oxide was prepared and determined for its OSC in an inert atmosphere and in a reducing atmosphere after high-temperature redox aging. In this example, the preparation of the Ce—Pr—Gd complex oxide, the determination of the OSC in the inert atmosphere, the determination of the OSC in the reducing atmosphere, and the high-temperature redox aging were carried out in the following manner.

(Preparation of $Ce_{0.75}Pr_{0.2}Gd_{0.05}$Oxide)

The Ce—Pr—Gd complex oxide used in this example was prepared by the so-called alkoxide process. Specifically, an alkoxide mixture solution was first prepared by dissolving, in 200 cm$^3$ of toluene, 55.4 g (0.128 mol) of cerium butoxide, 14.8 g (0.0342 mol) of praseodymium butoxide, and 3.9 g (0.0086 mol) of gadolinium butoxide. Then, the alkoxide mixture solution was gradually dripped into 600 cm$^3$ of deionized water in about 10 minutes for causing hydrolysis of the butoxide mixture. Then, the toluene and water content of the butoxide mixture solution was removed by vaporization. Then, the remaining hydrolysate (precursor) was dried at 60° C. for 24 hours and thereafter baked in an electric oven at 450° C. for 3 hours, thereby providing the target Ce—Pr—Gd complex oxide.

(High-Temperature Redox Aging)

The high-temperature redox aging was performed by repeating the same cycle as in Example 1, but the cycle repetition was performed various numbers of times.

(Determination of OSC in Inert Atmosphere)

The oxygen-storing oxide which was subjected to 500 hours of the high-temperature redox aging was first placed in an $O_2$-rich oxidizing atmosphere for 40 minutes for causing occlusion of oxygen. Then, the oxygen-storing oxide was put in an inert atmosphere for 5 minutes and weighed. Then, the oxygen-storing oxide was again placed in the $O_2$-rich oxidizing atmosphere for 40 minutes and weighed. The OSC of the oxygen-storing oxide in the inert atmosphere was calculated per unit weight (1 g) by subtracting the weight of the oxide having been put in the inert atmosphere from the weight of the same oxide having been put in the oxidizing atmosphere. The respective composition of the oxidizing atmosphere and the inert atmosphere was identical to that shown in Table 1 above. During this test, each of the different atmospheres was supplied at a flow rate of 3 dm$^3$/hr and maintained at a temperature of 500° C., as was also the case with Example 1.

(Determination of OSC in Reducing Atmosphere)

The OSC of the oxygen-storing oxide in the reducing atmosphere was determined in the same manner as in Example 1 before performing the high-temperature redox aging and after performing 5 hours, 50 hours, 140 hours and 500 hours, respectively, of the redox aging.

(Results)

Figure 6:
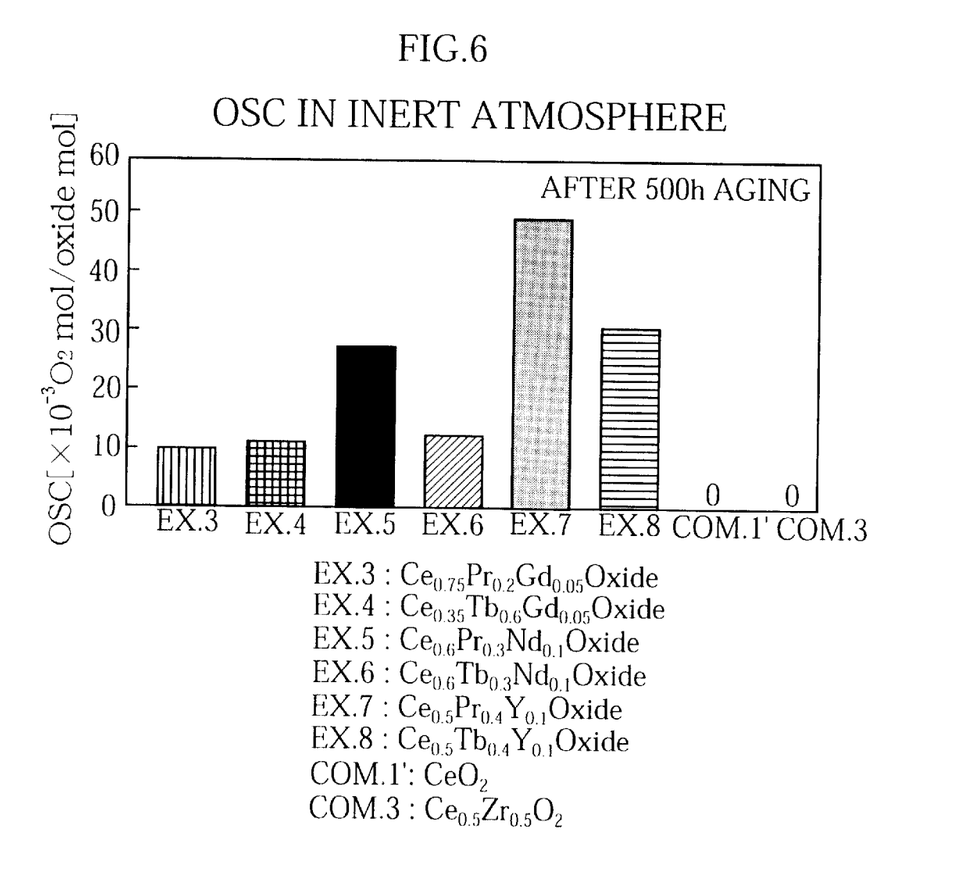
FIG. 6 is a graph showing the respective OSC of various oxygen-storing oxides in an inert atmosphere.
Figure 7:
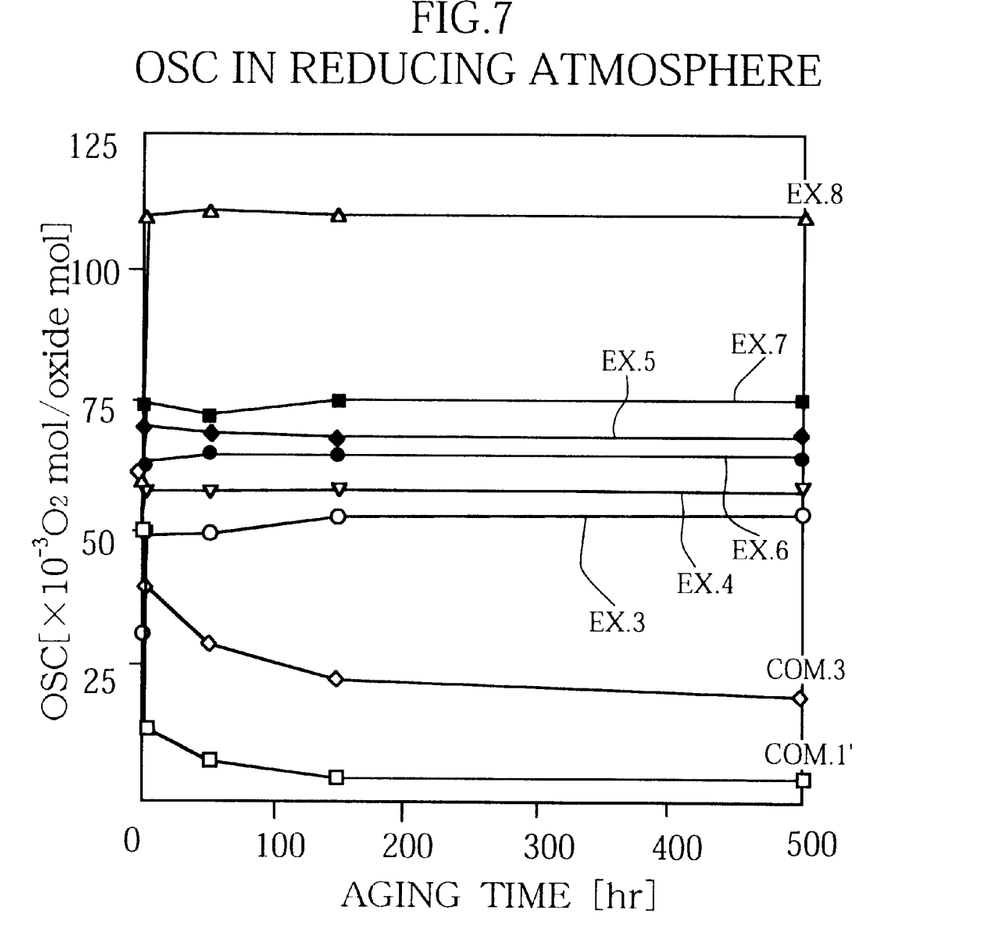
FIG. 7 is a graph showing the respective OSC of various oxygen-storing in a reducing atmosphere.

The post-aging OSC of $Ce_{0.75}Pr_{0.2}Gd_{0.05}$Oxide in the inert atmosphere is shown in FIG. 6, whereas the pre-aging and post-aging OSC of the same oxide in the reducing atmosphere is shown in FIG. 7.

EXAMPLE 4

In Example 4, $Ce_{0.35}Tb_{0.6}Gd_{0.05}$Oxide as an oxygen-storing oxide was prepared and determined for its OSC in the inert atmosphere and in the reducing atmosphere substantially in the same manner as in Example 3. The results are also shown in FIGS. 6 and 7.

For the preparation of the Ce—Tb—Gd complex oxide used in this example, an alkoxide mixture solution was prepared by dissolving, in 200 cm$^3$ of toluene, 26.0 g (0.06 mol) of cerium butoxide, 45.1 g (0.1 mol) of terbium butoxide, and 4.1 g (0.009 mol) of gadolinium butoxide. Otherwise, the Ce—Tb—Gd complex oxide was prepared in the same manner as in Example 3.

EXAMPLE 5

In Example 5, $Ce_{0.6}Pr_{0.3}Nd_{0.1}$Oxide as an oxygen-storing oxide was prepared and determined for its OSC in the inert atmosphere and in the reducing atmosphere substantially in the same manner as in Example 3. The results are also shown in FIGS. 6 and 7.

For the preparation of the Ce—Pr—Nd complex oxide used in this example, an alkoxide mixture solution was prepared by dissolving, in 200 cm$^3$ of toluene, 43.3 g (0.1 mol) of cerium butoxide, 21.66 g (0.05 mol) of praseodymium butoxide, and 7.4 g (0.017 mol) of neodymium butoxide. Otherwise, the Ce—Pr—Nd complex oxide was prepared in the same manner as in Example 3.

EXAMPLE 6

In Example 6, $Ce_{0.6}Tb_{0.3}Nd_{0.1}$Oxide as an oxygen-storing oxide was prepared and determined for its OSC in the inert atmosphere and in the reducing atmosphere substantially in the same manner as in Example 3. The results are also shown in FIGS. 6 and 7.

For the preparation of the Ce—Tb—Nd complex oxide used in this example, an alkoxide mixture solution was prepared by dissolving, in 200 cm$^3$ of toluene, 43.3 g (0.1 mol) of cerium butoxide, 22.6 g (0.05 mol) of terbium butoxide, and 7.4 g (0.017 mol) of neodymium butoxide. Otherwise, the Ce—Tb—Gd complex oxide was prepared in the same manner as in Example 3.

EXAMPLE 7

In Example 7, $Ce_{0.5}Pr_{0.4}Y_{0.1}$Oxide as an oxygen-storing oxide was prepared and determined for its OSC in the inert atmosphere and in the reducing atmosphere substantially in the same manner as in Example 3. The results are also shown in FIGS. 6 and 7.

For the preparation of the Ce—Pr—Y complex oxide used in this example, an alkoxide mixture solution was prepared by dissolving, in 200 cm$^3$ of toluene, 36.8 g (0.085 mol) of cerium butoxide, 30.3 g (0.07 mol) of praseodymium butoxide, and 6.5 g (0.017 mol) of yttrium butoxide. Otherwise, the Ce—Pr—Y complex oxide was prepared in the same manner as in Example 3.

EXAMPLE 8

In Example 8, $Ce_{0.5}Tb_{0.4}Y_{0.1}$Oxide as an oxygen-storing oxide was prepared and determined for its OSC in the inert atmosphere and in the reducing atmosphere substantially in the same manner as in Example 3. The results are also shown in FIGS. 6 and 7.

For the preparation of the Ce—Tb—Y complex oxide used in this example, an alkoxide mixture solution was prepared by dissolving, in 200 cm$^3$ of toluene, 36.8 g (0.085 mol) of cerium butoxide, 30.9 g (0.07 mol) of terbium butoxide, and 6.5 g (0.017 mol) of yttrium butoxide.

Otherwise, the Ce—Tb—Y complex oxide was prepared in the same manner as in Example 3.

Comparison 1'

In Comparison 1', $CeO_2$ which itself was commercially available was selected as an oxygen-storing oxide and determined for its OSC in the inert atmosphere and in the reducing atmosphere substantially in the same manner as in Example 3. The results are also shown in FIGS. 6 and 7.

Comparison 3

In Comparison 3, $Ce_{0.5}Zr_{0.5}O_2$ as an oxygen-storing oxide was prepared and determined for its OSC in the inert atmosphere and in the reducing atmosphere substantially in the same manner as in Example 3. The results are also shown in FIGS. 6 and 7.

For the preparation of the Ce—Zr complex oxide used in this comparative example, an alkoxide mixture solution was prepared by dissolving, in 200 cm³ of toluene, 36.8 g (0.085 mol) of cerium butoxide and 32.8 g (0.085 mol) of zirconium butoxide. Otherwise, the Ce—Zr complex oxide was prepared in the same manner as in Example 3.

Evaluation of FIGS. 6 and 7

The OSC of the oxygen-storing oxide in the inert atmosphere represents the capacity of the oxide to occlude and release oxygen when the oxide is put alternately in the oxidizing atmosphere (corresponding to a lean state) and in the inert atmosphere (corresponding to the stoichiometric state). By contrast, the OSC of the oxygen-storing oxide in the reducing atmosphere represents the capacity of the oxide to occlude and release oxygen when the oxide is put alternately in the oxidizing atmosphere and in the reducing atmosphere (corresponding to a rich state).

As appreciated from FIG. 6, the Pr- or Tb-containing complex oxides (Examples 3~8) are far higher with respect to OSC in the inert atmosphere than $CeO_2$ (Comparison 1') and $Ce_{0.5}Zr_{0.5}O_2$ (Comparison 3). This means that the Pr- or Tb-containing complex oxide is capable of releasing oxygen even in the inert atmosphere. Therefore, the Pr- or Tb-containing complex oxide, when incorporated in a catalytic converter, is capable of effectively storing and releasing oxygen even if the control center point for the air-fuel mixture shifts from the stoichiometric state to a lean side.

Further, as appreciated from FIG. 7, the OSC of the Pr- or Tb-containing complex oxides (Examples 3~8) in the reducing atmosphere remains very high even after 500 hours of the high-temperature redox aging particularly due to the additional inclusion of Nd, Y or Gd, whereas the respective OSC of $CeO_2$ (Comparison 1') and $Ce_{0.5}Zr_{0.5}O_2$ (Comparison 3) in the reducing atmosphere drops drastically after only 5 hours of the high-temperature redox aging. Therefore, it is expected that a catalytic converter utilizing the Pr- or Tb-containing complex oxide combined with a catalytically active substance or substances will provide a high catalytic activity not only before aging but also after long use under severe high temperature conditions.

EXAMPLE 9

In Example 9, $Ce_{0.3}Pr_{0.5}Zr_{0.2}Oxide$ was prepared and determined for its OSC in an inert atmosphere and in a reducing atmosphere after high-temperature redox aging. In this example, the preparation of the Ce—Pr—Zr complex oxide, the determination of the OSC in the inert atmosphere, the determination of the OSC in the reducing atmosphere, and the high-temperature redox aging were carried out in the following manner.

(Preparation of $Ce_{0.3}Pr_{0.5}Zr_{0.2}Oxide$)

For the preparation of the Ce—Pr—Zr complex oxide used in this example, an alkoxide mixture solution was prepared by dissolving, in 200 cm³ of toluene, 22.2 g (0.0513 mol) of cerium butoxide, 37.0 g (0.0855 mol) of praseodymium butoxide, and 13.1 g (0.0342 mol) of zirconium butoxide. Otherwise, the Ce—Pr—Zr complex oxide was prepared in the same manner as in Example 3.

(High-Temperature Redox Aging)

The high-temperature redox aging was performed by repeating the same cycle as in Example 1, but the cycle was repeated twenty times for a total period of 10 hours.

(Determination of OSC in Inert Atmosphere)

The oxygen-storing oxide which was subjected to 10 hours of the high-temperature redox aging was determined for its OSC in the inert atmosphere in the same manner as in Example 3 except that the time of exposure to the inert atmosphere was decreased to 3 minutes (instead of 5 minutes in Example 3).

Determination of OSC in Reducing Atmosphere)

The OSC of the oxygen-storing oxide in the reducing atmosphere was determined in the same manner as in Example 1 after performing 10 hours of the redox aging.

(Results)

Figure 8:
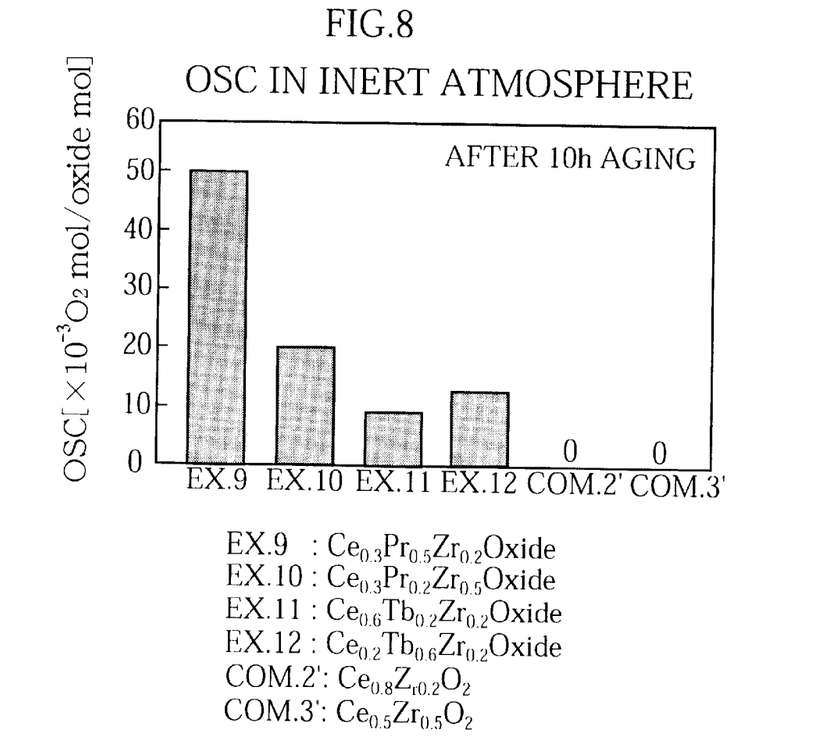
FIG. 8 is a graph showing the respective OSC of various oxygen-storing oxides in an inert atmosphere.
Figure 9:
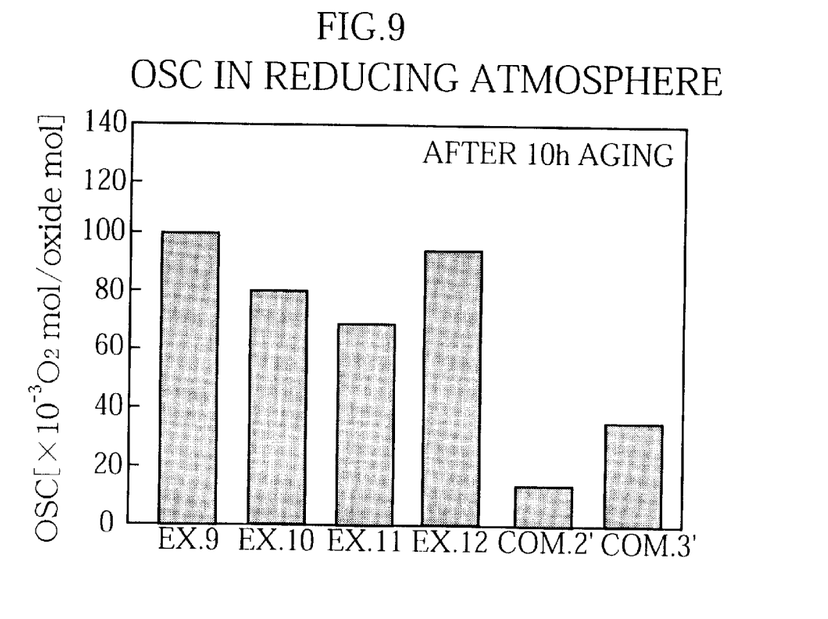
FIG. 9 is a graph showing the respective OSC of various oxygen-storing oxides in a reducing atmosphere.

The post-aging OSC of $Ce_{0.3}Pr_{0.5}Zr_{0.2}Oxide$ in the inert atmosphere is shown in FIG. 8, whereas the post-aging OSC of the same oxide in the reducing atmosphere is shown in FIG. 9.

EXAMPLE 10

In Example 10, $Ce_{0.3}Pr_{0.2}Zr_{0.5}Oxide$ as an oxygen-storing oxide was prepared and determined for its OSC in the inert atmosphere and in the reducing atmosphere substantially in the same manner as in Example 9. The results are also shown in FIGS. 8 and 9.

For the preparation of the Ce—Pr—Zr complex oxide used in this example, an alkoxide mixture solution was prepared by dissolving, in 200 cm³ of toluene, 22.2 g (0.0513 mol) of cerium butoxide, 14.8 g (0.0342 mol) of praseodymium butoxide, and 32.8 g (0.0855 mol) of zirconium butoxide. Otherwise, the Ce—Pr—Zr complex oxide was prepared in the same manner as in Example 9.

EXAMPLE 11

In Example 11, $Ce_{0.6}Tb_{0.2}Zr_{0.2}Oxide$ as an oxygen-storing oxide was prepared and determined for its OSC in the inert atmosphere and in the reducing atmosphere substantially in the same manner as in Example 9. The results are also shown in FIGS. 8 and 9.

For the preparation of the Ce—Tb—Zr complex oxide used in this example, an alkoxide mixture solution was prepared by dissolving, in 200 cm³ of toluene, 51.0 g (0.1026 mol) of cerium methoxypropylate, 17.6 g (0.0342 mol) of terbium methoxypropylate, and 15.3 g (0.0342 mol) of zirconium methoxypropylate. Otherwise, the Ce—Pr—Zr complex oxide was prepared in the same manner as in Example 9.

EXAMPLE 12

In Example 12, $Ce_{0.2}Tb_{0.6}Zr_{0.2}Oxide$ as an oxygen-storing oxide was prepared and determined for its OSC in the inert atmosphere and in the reducing atmosphere substantially in the same manner as in Example 9. The results are also shown in FIGS. 8 and 9.

For the preparation of the Ce—Pr—Zr complex oxide used in this example, an alkoxide mixture solution was prepared by dissolving, in 200 cm$^3$ of toluene, 17.0 g (0.0342 mol) of cerium methoxypropylate, 52.8 g (0.1026 mol) of terbium methoxypropylate, and 15.3 g (0.0342 mol) of zirconium methoxypropylate. Otherwise, the Ce—Pr—Zr complex oxide was prepared in the same manner as in Example 9.

EXAMPLE 13

Figure 10:
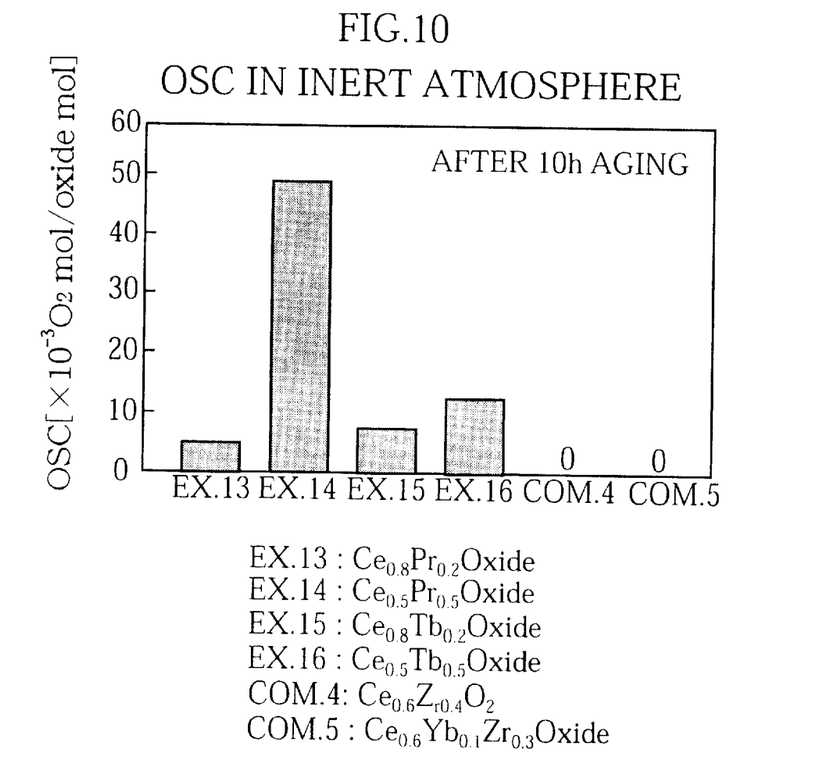
FIG. 10 is a graph showing the respective OSC of various oxygen-storing oxides in an inert atmosphere.
Figure 11:
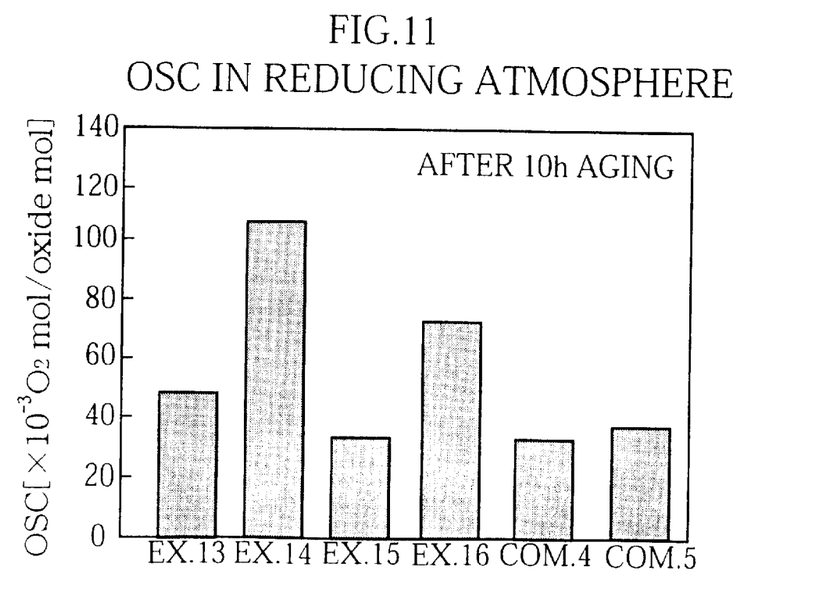
FIG. 11 is a graph showing the respective OSC of various oxygen-storing oxides in a reducing atmosphere.

In Example 13, $Ce_{0.8}Pr_{0.2}Oxide$ as an oxygen-storing oxide was prepared and determined for its OSC in the inert atmosphere and in the reducing atmosphere substantially in the same manner as in Example 9. The results are shown in FIGS. 10 and 11.

For the preparation of the Ce—Pr complex oxide used in this example, an alkoxide mixture solution was prepared by dissolving, in 200 cm$^3$ of toluene, 59.2 g (0.1368 mol) of cerium butoxide and 13.1 g (0.0342 mol) of praseodymium butoxide. Otherwise, the Ce—Pr—Zr complex oxide was prepared in the same manner as in Example 9.

Further, in this example, the same redox aging cycle as in Example 9 was repeated ten times for a total period of 5 hours.

EXAMPLE 14

In Example 14, $Ce_{0.5}Pr_{0.5}Oxide$ as an oxygen-storing oxide was prepared and determined for its OSC in the inert atmosphere and in the reducing atmosphere substantially in the same manner as in Example 13. The results are shown in FIGS. 10 and 11.

For the preparation of the Ce—Pr complex oxide used in this example, an alkoxide mixture solution was prepared by dissolving, in 200 cm$^3$ of toluene, 37.2 g (0.086 mol) of cerium butoxide and 32.9 g (0.086 mol) of praseodymium butoxide.

Otherwise, the Ce—Pr complex oxide was prepared in the same manner as in Example 13.

EXAMPLE 15

In Example 15, $Ce_{0.8}Tb_{0.2}Oxide$ as an oxygen-storing oxide was prepared and determined for its OSC in the inert atmosphere and in the reducing atmosphere substantially in the same manner as in Example 13. The results are shown in FIGS. 10 and 11.

For the preparation of the Ce—Tb complex oxide used in this example, an alkoxide mixture solution was prepared by dissolving, in 200 cm$^3$ of toluene, 59.2 g (0.1368 mol) of cerium butoxide and 15.4 g (0.0342 mol) of terbium butoxide.

Otherwise, the Ce—Tb complex oxide was prepared in the same manner as in Example 13.

EXAMPLE 16

In Example 16, $Ce_{0.5}Tb_{0.5}Oxide$ as an oxygen-storing oxide was prepared and determined for its OSC in the inert atmosphere and in the reducing atmosphere substantially in the same manner as in Example 13. The results are shown in FIGS. 10 and 11.

For the preparation of the Ce—Tb complex oxide used in this example, an alkoxide mixture solution was prepared by dissolving, in 200 cm$^3$ of toluene, 37.2 g (0.086 mol) of cerium butoxide and 38.7 g (0.086 mol) of terbium butoxide. Otherwise, the Ce—Tb complex oxide was prepared in the same manner as in Example 13.

Comparison 2'

In Comparison 2', $Ce_{0.8}Zr_{0.2}O_2$ as an oxygen-storing oxide was determined for its OSC in the inert atmosphere and in the reducing atmosphere substantially in the same manner as in Example 9. The results are shown in FIGS. 8 and 9.

The Ce—Zr complex oxide used in this comparative example was prepared in the same manner as in Comparison 2.

Comparison 3'

In Comparison 3', $Ce_{0.5}Zr_{0.5}O_2$ as an oxygen-storing oxide was determined for its OSC in the inert atmosphere and in the reducing atmosphere substantially in the same manner as in Example 9. The results are also shown in FIGS. 8 and 9.

The Ce—Zr complex oxide used in this comparative example as prepared in the same manner as in Comparison 3.

Comparison 4

In Comparison 4, $Ce_{0.6}Zr_{0.4}O_2$ as an oxygen-storing oxide was prepared and determined for its OSC in the inert atmosphere and in the reducing atmosphere substantially in the same manner as in Example 13. The results are shown in FIGS. 10 and 11.

For the preparation of the Ce—Zr complex oxide used in this comparative example, an alkoxide mixture solution was prepared by dissolving, in 200 cm$^3$ of toluene, 44.4 g (0.1026 mol) of cerium butoxide and 26.24 g (0.068 mol) of zirconium butoxide. Otherwise, the Ce—Zr complex oxide was prepared in the same manner as in Comparison 3.

Comparison 5

In Comparison 5, $Ce_{0.6}Yb_{0.1}Zr_{0.3}O_2$ as an oxygen-storing oxide was prepared and determined for its OSC in the inert atmosphere and in the reducing atmosphere substantially in the same manner as in Example 13. The results are also shown in FIGS. 10 and 11.

For the preparation of the Ce—Yb—Zr complex oxide used in this comparative example, an alkoxide mixture solution was prepared by dissolving, in 200 cm$^3$ of toluene, 44.4 g (0.1026 mol) of cerium butoxide, 8.0 g (0.0171 mol) of ytterbium butoxide and 19.7 g (0.0513 mol) of zirconium butoxide. Otherwise, the Ce—Zr complex oxide was prepared in the same manner as in Comparison 3.

Evaluation of FIGS. 8~11

As appreciated from FIGS. 8 and 10, the Pr- or Tb-containing complex oxides (Examples 9~16) provides a very high OSC in the inert atmosphere, whereas $Ce_{0.8}Zr_{0.2}O_2$ (Comparison 2'), $Ce_{0.5}Zr_{0.5}O_2$ (Comparison 3'), $Ce_{0.6}Zr_{0.4}O_2$ (Comparison 4') and $Ce_{0.6}Yb_{0.5}Zr_{0.3}O_2$ (Comparison 5) exhibit no OSC in the inert atmosphere. Therefore, the Pr- or Tb-containing complex oxide, when incorporated in a catalytic converter, is capable of effectively storing and releasing oxygen even if the control center point for the air-fuel mixture shifts from the stoichiometric state to a lean side.

Further, as appreciated from FIGS. 9 and 11, the Pr- or Tb-containing complex oxides (Examples 9~16) provide a higher post-aging OSC in the reducing atmosphere than those (Comparisons 2'~5) not containing Pr or Tb. Therefore, it is expected that a catalytic converter utilizing the Pr- or Tb-containing complex oxide combined with a catalytically active substance or substances will provide a high catalytic activity for a long time when the exhaust gas from the engine shifts between a lean state and a rich state; i.e., when the control center point for the air-fuel mixture coincides with the stoichiometric state.

What is claimed is:

1. A catalytic converter for cleaning exhaust gas comprising:

a heat-resistant support; and a coating formed on the support, the coating including at least one kind of catalytically active substance and at least one kind of oxygen-storing oxide;

wherein the oxygen-storing oxide is a complex oxide of the following formula, $$Ce_{1-(x+y)}R_xE_y\text{Oxide}$$

where "R" represents Pr or Tb, "E" represents at least one element selected from a group consisting of Nd, Y and Gd, the complex oxide meeting the relations $0.2 \leq x \leq 0.6$, $0.05 \leq y \leq 0.1$, and $0.25 \leq x+y \leq 0.7$ in said formula.

2. The catalytic converter according to claim 1, wherein at least part of the complex oxide is solid solution.

3. The catalytic converter according to claim 1, wherein the catalytically active substance is selected from a group consisting of Pt, Rh and Pd.

4. The catalytic converter according to claim 1, wherein the coating further includes at least one heat-resistant inorganic oxide selected from a group consisting of alumina, silica, titania, magnesia and zirconia.

5. The catalytic converter according to claim 1, wherein the heat-resistant support has a honeycomb structure.

6. The catalytic converter according to claim 1, wherein the coating comprises a plurality of laminated layers including an outermost layer, the oxygen-storing oxide being contained in at least one of the coating layers.

7. The catalytic converter according to claim 6, wherein the catalytically active substance comprises Pd and Rh which are separately contained in different layers of the coating.

8. The catalytic converter according to claim 6, wherein the catalytically active substance comprises Pd which is contained in a layer of the coating other than the outermost layer.

* * * * *